United States Patent [19]
Fulton et al.

[11] Patent Number: 5,847,562
[45] Date of Patent: Dec. 8, 1998

[54] THICKNESS GAUGING OF SINGLE-LAYER CONDUCTIVE MATERIALS WITH TWO-POINT NON LINEAR CALIBRATION ALGORITHM

[75] Inventors: James P. Fulton, Clifton Park, N.Y.; Min Namkung, Yorktown, Va.; John W. Simpson, Tabb, Va.; Russell A. Wincheski, Williamsburg, Va.; Shridhar C. Nath, Ames, Iowa

[73] Assignee: The United States of America as represented by the Administrator of the National Aeronautics and Space Administration, Washington, D.C.

[21] Appl. No.: 852,990

[22] Filed: May 8, 1997

Related U.S. Application Data

[60] Provisional application No. 60/018,182 May 8, 1996.

[51] Int. Cl.⁶ .............................. G01B 7/06; G01R 33/12
[52] U.S. Cl. ......................... 324/229; 324/202; 324/230; 324/240; 324/241
[58] Field of Search .................................... 324/228, 209, 324/202, 225, 226, 229, 239, 240, 241, 242, 243, 262, 230, 236

[56] References Cited

U.S. PATENT DOCUMENTS 5,617,024   4/1997   Simpson et al. ........................ 324/209

Primary Examiner—Jay M. Patidar
Attorney, Agent, or Firm—Robin W. Edwards

[57] ABSTRACT

A thickness gauging instrument uses a flux focusing eddy current probe and two-point nonlinear calibration algorithm. The instrument is small and portable due to the simple interpretation and operational characteristics of the probe. A nonlinear interpolation scheme incorporated into the instrument enables a user to make highly accurate thickness measurements over a fairly wide calibration range from a single side of nonferromagnetic conductive metals. The instrument is very easy to use and can be calibrated quickly.

16 Claims, 5 Drawing Sheets

THICKNESS GAUGING OF SINGLE-LAYER CONDUCTIVE MATERIALS WITH TWO-POINT NON LINEAR CALIBRATION ALGORITHM

ORIGIN OF THE INVENTION

The invention described herein was jointly made by employees of the United States Government and during the performance of work under NASA contracts and is subject to provisions of Section 305 of the National Aeronautics and Space Act of 1958, as amended, Public Law 85-568 (72 Stat. 435; 42 USC 2457), and 35 USC 202, respectively. In accordance with 35 USC 202, the contractor elected not to retain title.

CLAIM OF BENEFIT OF PROVISIONAL APPLICATION

Pursuant to 35 U.S.C. §119, the benefit of priority from provisional application Ser. No. 60/018,182, with a filing date of May 8, 1996, is claimed for this non-provisional application.

BACKGROUND OF THE INVENTION

1. Field of the Invention

The invention relates generally to the field of nondestructive examination. It relates specifically to the measurement of the thickness of single-layer nonferromagnetic conducting materials using a flux focusing eddy current probe having a flux focusing lens, and a nonlinear two-point calibration and interpolation procedure which sweeps a range of frequencies.

2. Description of the Related Art

Metal thickness and thinning are currently detected using both ultrasonic and eddy current techniques. Ultrasonic instruments send a wave packet through the material from the front surface to the back surface where the wave is reflected back to the transducer. The time it takes for the wave to make this round trip is directly proportional to the thickness of the material. When the part being inspected is thin (of the order of 0.01 in.), the leading edge of the pulse will return to the transducer before the trailing edge of the pulse is transmitted, making it impossible to get an accurate measure for the time of flight of the wave packet. Ultrasonic methods also suffer from the need to be in direct contact with the part being inspected, making it difficult to perform measurement on painted surfaces.

Conventional eddy current instruments measure material thickness by monitoring the change in the impedance of a solenoid coil placed near the surface of the material. These instruments can be used to measure the thickness of painted surfaces. The main disadvantage of conventional eddy current techniques are the complicated calibration and signal interpretation required to make thickness measurements. In addition, the high cost of the impedance plane equipment needed to take data is a major disadvantage of the technique.

OBJECTS

Therefore, it is an object of the present invention to perform thickness gauging of nonferromagnetic, conductive materials using eddy current techniques.

It is another object of the present invention to perform thickness gauging of thin and painted nonferromagnetic, conductive materials using eddy current techniques.

It is a further object of the present invention to provide a thickness gauging instrument which uses a flux focusing eddy current probe having a flux focusing lens.

It is a still further object of the present invention to provide a thickness gauging instrument which uses a flux focusing eddy current probe, having a flux focusing lens, and a two-point nonlinear calibration and interpolation means which sweeps a range of frequencies.

Additional objects and advantages of the present invention are apparent from the drawings and specification which follow.

SUMMARY OF THE INVENTION

According to the present invention, the foregoing and other objects and advantages are attained by providing a thickness gauging instrument which uses a flux focusing eddy current probe and a two-point nonlinear calibration and interpolation means to measure the thickness of single-layer nonferromagnetic, conductive materials. The eddy current probe has an excitation coil, a pick-up coil, and a flux focusing lens disposed between the excitation and pick-up coils. The two-point calibration means is a nonlinear algorithm $y=ax^b$ which is embedded on an EPROM chip. The nonlinear algorithm is used with a thin test coupon and a thick test coupon, both of the same material as the sample to be measured and enveloping the thickness of the sample to be measured. In operation, the excitation coil is excited within a predetermined frequency range. The induced pick-up coil voltages are recorded. Display means and data input means allow for communication with the operator.

The current thickness gauging instrument provides the ability to make accurate and economical thickness measurements of thin and painted nonferromagnetic, conductive materials. The ease of use of the instrument removes the need for special training to perform tests and interpret the test results. It also provides the capability for detecting metal thinning due to corrosion in critical structures, as well as provides for quality control during metal plate manufacture.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1A:
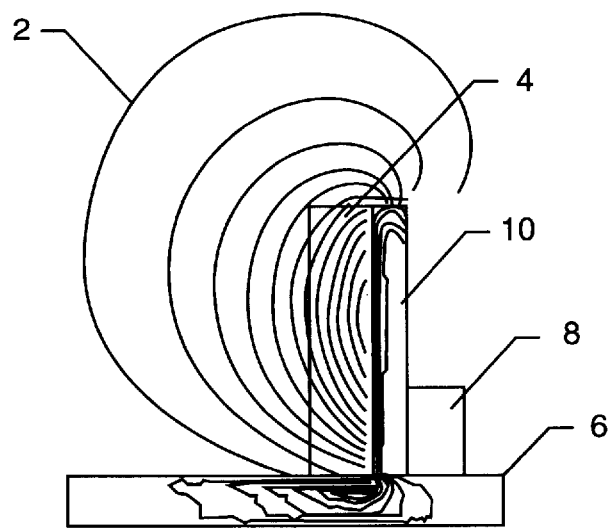
FIGS. 1A and 1B illustrate flux in an eddy current probe for low frequencies.
Figure 1B:
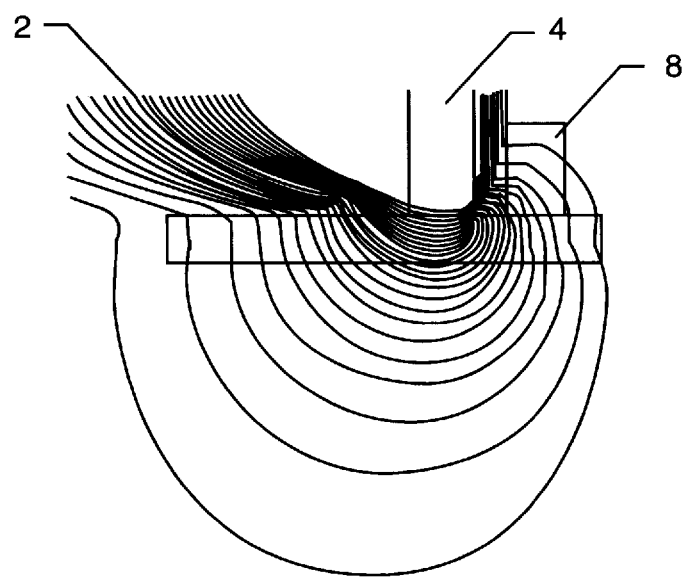

The current invention is a thickness gauging instrument which uses a flux focusing eddy current probe, as claimed in U.S. Pat. No. 5,617,024, and incorporated herein by reference, to make single point measurements of the thickness of nonferromagnetic, conducting materials. The simplicity of the probe makes instrumentation costs much less than conventional eddy current devices. In addition, all measurements can be made by monitoring only the amplitude of the probe's output signal so that data interpretation and processing schemes are greatly simplified. A unique feature of the probe is the presence of a flux focusing lens between the excitation and pick-up coils. The flux focusing lens prevents magnetic coupling between the excitation coil and the pick-up coil when the probe is placed above an unflawed electrically conductive material and produces a high flux density at the outer edge of the pick-up coil. When the operating frequency of the probe is sufficiently high, the probe produces a large signal when the sensor is held in air, but a negligible output when placed on an unflawed nonferromagnetic, conductive sample. This phenomenon is due to the flux focusing lens which focuses the magnetic flux in a ring around the pick-up coil. The ring of flux induces eddy currents in the sample which, together with the flux focusing lens, isolate the pick-up coil from the excitation coil. As the excitation frequency is reduced, the probe no longer provides a null voltage. The flux 2 from the excitation coil 4 passes through the sample 6 into and around the flux focusing lens 10 and begins to link with the pick-up coil 8, as shown in FIGS. 1A and 1B.

Figure 2:
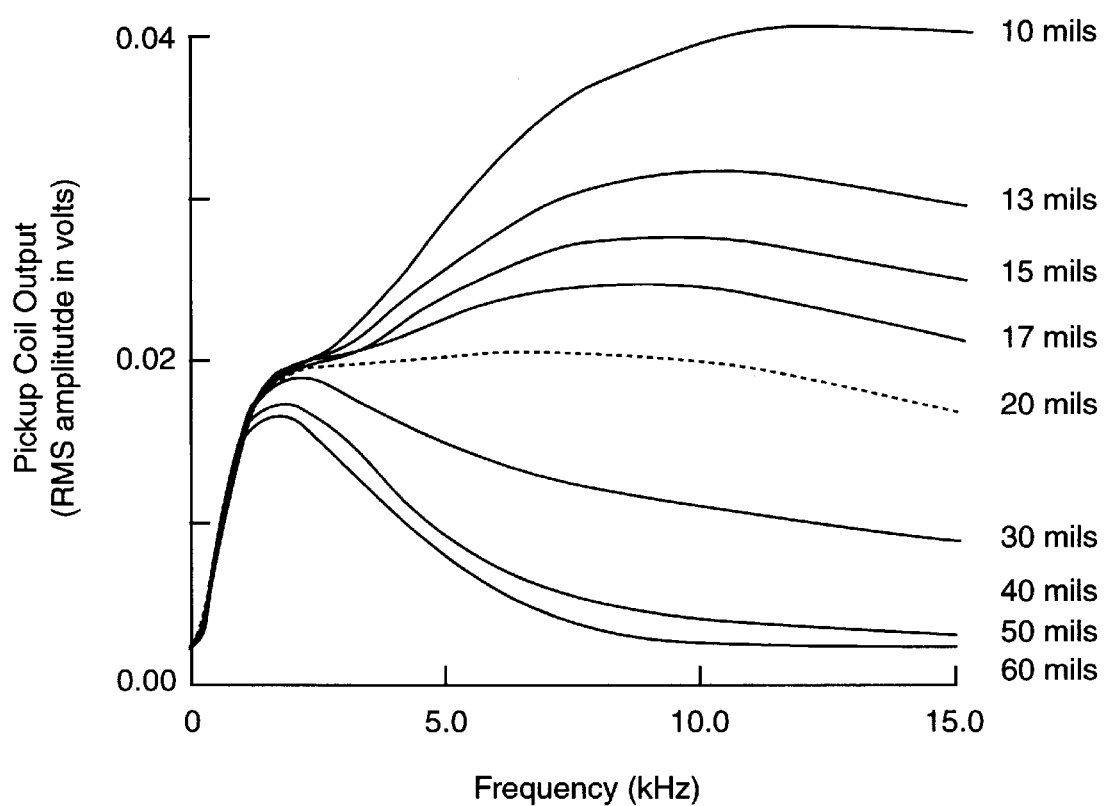
FIG. 2 shows a probe's output as a function of frequency for aluminum varying from 0.01 in. to 0.06 in. thick.

The instrument's output at low frequencies, typically from 1 kHz to 20 kHz, is dependent on the thickness of the material under test. The selection of specific frequencies is dependent on the particular material being tested, with lower conductivity materials requiring higher frequencies than those materials with higher conductivities. FIG. 2 shows a probe's output, as a function of frequency, for aluminum thicknesses varying from 0.01 in. to 0.06 in. The present instrument takes advantage of the separation between the curves of FIG. 2 in order to make thickness measurements of a single layer sample using a two-point nonlinear calibration procedure. Calibration is performed with two samples of known thicknesses that are representative of the upper and lower thickness values to be measured. The accuracy of the instrument's thickness measurement depends on the calibration range, with a larger range giving a larger error. Within the calibration range, the measured thicknesses are typically within 2% to 3% of their actual values.

The instrument is first calibrated for the material to be tested using a thin test coupon and a thick test coupon, each coupon of the same material as the specimen to be measured. The value of the thickness of the thin test coupon is stored in a variable $y_1$. The value of the thickness of the thick test coupon is stored in a variable $y_2$. The probe is placed on the thin test coupon and the frequency of the excitation coil is varied, typically from 1 kHz to 20 kHz in 100 Hz increments. The 100 Hz step represents a compromise between speed and accuracy. Other steps can be used. The pick-up coil output at each frequency is measured. The values are then added together and stored in a variable $x_1$. If the step size between the frequencies does not remain the same, a scaling factor will be needed to account for the variation. For example, if one step is 100 Hz and another is 150 Hz, the output corresponding to the 150 Hz step will have to be multiplied by a factor of 1.5. This procedure should be repeated for the thick coupon and the result stored in a variable $x_2$.

The two data points $(x_1,y_1)$ and $(x_2,y_2)$ correspond to the thin and thick samples, respectively. The above data together with data taken at intermediate thickness values fits accurately to a curve defined by a power function, $y=ax^b$, where y represents thickness and x represents the summed pick-up coil output voltage. The values of the coefficient a and the power b vary depending upon the material being tested. The interpolating function $y=ax^b$ that passes through the two data points $(x_1,y_1)$ and $(x_2,y_2)$ is used to approximate the thickness at intermediate values. The values of a and b are determined by solving a system of simultaneous equations and the results are as follows:

$$b = \frac{\log(y_1/y_2)}{\log(x_1/x_2)} \quad (1)$$

$$a = 10^{\left(\frac{(\log x_1)\log y_2 - (\log x_2)\log y_1}{\log(x_1/x_2)}\right)} \quad (2)$$

where $y_1$ and $y_2$ are the thickness values of the thin and thick test samples respectively and $x_1$ and $x_2$ are the associated sums of the pick-up coil output. The algorithm $y=ax^b$ is incorporated into a portable instrument using an EPROM chip to perform the necessary calculations. The algorithm $y=ax^b$ is easy to use, is able to provide accurate and repeatable results, and is applicable over a wide range of thicknesses variations.

After a and b are calculated, the instrument is calibrated and ready to make thickness measurements. First, the probe is placed on a sample of unknown thickness. The frequency is varied, the pick-up coil outputs are summed, and the resulting summation value is placed in x. To determine the thickness associated with the measured value of x, $y=ax^b$ is computed using the values for a and b obtained above where y corresponds to the approximate thickness.

Figure 3:
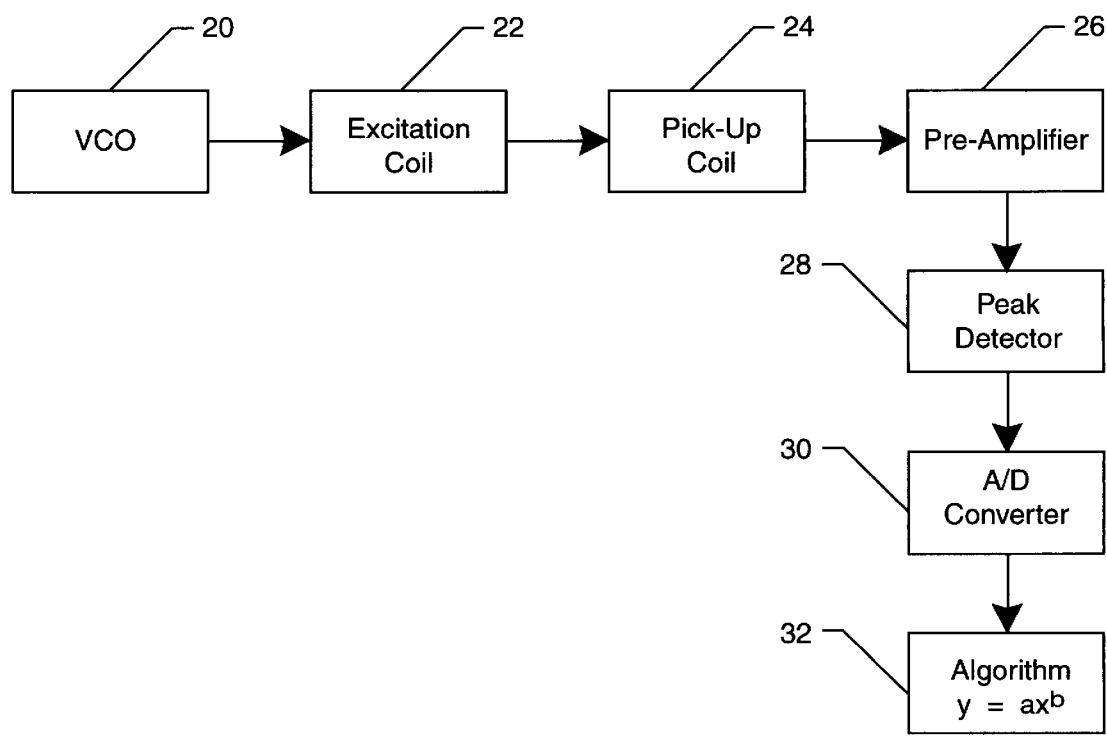
FIG. 3 illustrates a block diagram of electronic means for exciting the excitation coil at predetermined frequency increments within a predetermined frequency range and recording means for recording pick-up coil voltages.
Figure 4:
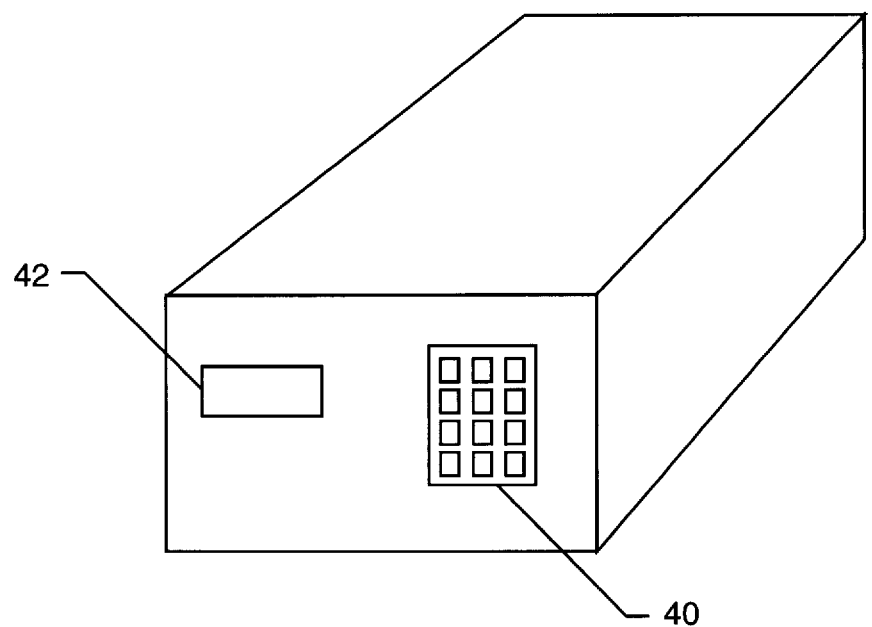
FIG. 4 illustrates a numeric touch pad on the instrument face for data input and an LED display to prompt the operator and present calculated thickness results.

As illustrated in FIG. 3, a voltage controlled oscillator 20 (VCO) within the instrument steps through the predetermined frequency range, thereby exciting the excitation coil 22 of the probe. At each frequency step, the induced voltage across the pick-up coil 24 is recorded for input into the algorithm 32 with suitable electronics; e.g., a preamplifier 26, peak detector 28, and analog to digital converter 30 (A-D converter) contained within the instrument. The specific electronics and variations thereof are known to those skilled in the art. The frequency step size, frequency range, and settling time when going from one frequency to the next are optimized to provide fast measurement times and high stability of readings. These optimum values are stored along with the control program in the EPROM which also performs the data analysis through the algorithm $y=ax^b$. As illustrated in FIG. 4, a numeric touch pad 40 on the instrument face allows for data input during instrument set-up and calibration. An LED display 42 is used to prompt the operator during instrument set-up and calibration and to present the operator with the calculated thickness results.

The relationship between the output of the instrument and both the thickness of the sample and the frequency of the excitation coil is nonlinear, as FIG. 2 illustrates. A piecewise linear interpolation scheme could be used but the calibration range would have to be relatively small. As a result, a rather extensive set of calibration standards would be required and testing would become rather tedious and cumbersome. The use of the algorithm $y=ax^b$ accounts for the nonlinearity by using nonlinear interpolation. This nonlinear approach has an increased range of applicability for a given set of standards and a less complicated calibration procedure for the operator. It does, however, require instrumentation with greater computational capabilities.

Figure 5:
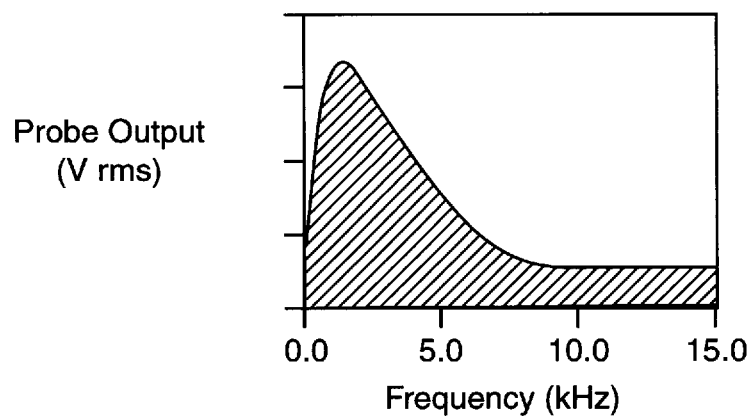
FIG. 5 shows a typical integrating signal.
Figure 6:
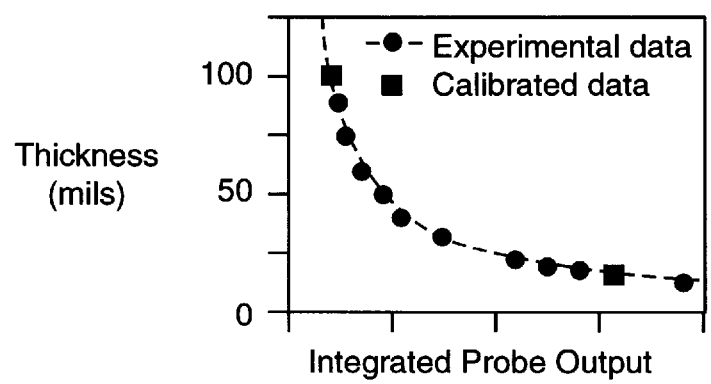
FIG. 6 shows integrated instrument output as a function of thickness.

Another difficulty with quantifying results over a wide range of thicknesses is the dependence of thickness separation on the excitation frequency. Higher frequencies are better for separating out the thinner samples, while thicker samples need information from the lower frequencies for a reasonable degree of separation. Consequently, the "ideal" frequency with which to inspect a particular sample would need to be determined before testing. This would unnecessarily complicate the testing. Using the results from many frequencies instead of using only a single frequency measurement enables a wider measurement range without requiring a priori knowledge by the operator. Integrating the probe output as a suitable range of frequencies are swept yields a unique value depending upon the thickness and conductivity of the sample. A typical integrating signal is shown schematically in FIG. 5, where the area beneath the curve is unique for each sample thickness. When this integrated instrument output is plotted as a function of the sample thickness, the results fit the power function, $y=ax^b$, as shown in FIG. 6. Using this interpolation scheme, it is possible to calibrate the instrument over a fairly wide range using only two calibration points separated by a fairly large thickness variation. Thus, the user will only have to calibrate the instrument on a thin and thick sample with known thicknesses and then use the values to create an interpolation curve for subsequent thickness measurements.

After calibration, the instrument can be used to make single or continuous thickness measurements over the range of calibration. To obtain better resolution, the calibration range can be reduced. The instrument has been used to measure the thickness of samples ranging from 0.25 mm (0.01 in) to 3 mm (0.12 in) to within a tolerance of 0.013 mm (0.0005 in).

The sensor is fairly insensitive to lift-off. Measurements made on samples with up to 0.3 mm (0.012 in) of a nonconductive coating, such as paint, on the surface were within 4% of their actual thicknesses.

Other variations will be readily apparent to those of skill in the art. The forgoing is not intended to be an exhaustive list of modifications but rather is given by way of example. It is understood that it is in no way limited to the above embodiments, but is capable of numerous modifications within the scope of the following claims.

We claim:

1. An instrument for single-layer thickness gauging of nonferromagnetic conductive materials, comprising:
   a flux focusing eddy current probe comprising an excitation coil, a pick-up coil, and a flux focusing lens disposed between the excitation coil and the pick-up coil;
   electronic means for exciting the excitation coil at predetermined frequency increments within a predetermined frequency range;
   recording means for recording pick-up coil voltages induced by the excitation coil;
   two-point nonlinear means for calibrating the instrument and interpolating thickness from pick-up coil output;
   data input means for inputting data during instrument set-up and calibration; and
   display means for prompting data input during set-up and calibration of the instrument and for presenting thickness results.

2. The instrument of claim 1, wherein the electronic means comprises a voltage controlled oscillator.

3. The instrument of claim 1, wherein the recording means comprises:
   a preamplifier to amplify the pick-up coil output;
   a peak detector to detect the amplitude of the pick-up coil's sinusoidal output; and
   an analog to digital converter to convert the analog output from the peak detector to a digital value which is input to the algorithm.

4. The instrument of claim 1, wherein the data input means comprises a numeric touch pad on the instrument's face.

5. The instrument of claim 1, wherein the display means comprises an LED display on the instrument's face.

6. The instrument of claim 1, wherein the two-point nonlinear means comprises:
   a thin test coupon having a thickness represented by the variable $y_1$ and having the same material as the sample to be measured;
   a thick test coupon having a thickness represented by the variable $y_2$ and having the same material as the sample to be measured;
   where $y_1$ and $y_2$ envelope the thickness of the sample to be measured;
   a variable $x_1$ representing the summed outputs of the pick-up coil over predetermined frequency increments within a predetermined frequency range for the thin test coupon;
   a variable $x_2$ representing the summed outputs of the pick-up coil over predetermined frequency increments within a predetermined frequency range for the thick test coupon; and
   an algorithm $y=ax^b$, where the algorithm is solved for a and b based on the inputs (x1,y1) and (x2,y2), thereby calibrating the instrument, and where the algorithm is used following calibration to calculate the thickness of the sample based on summed pick-up coil outputs over predetermined frequency increments within a predetermined frequency range.

7. The instrument of claim 6, wherein the frequency range and frequency increments are the same for the thin test coupon and the thick test coupon.

8. The instrument of claim 6, wherein the frequency range is the same for the thin and thick test coupons but the frequency increments are different.

9. The device of claim 6, wherein the two-point nonlinear calibration means is incorporated on an EPROM chip.

10. The instrument of claim 6, wherein the frequency range is from 1 kHz to 20 kHz.

11. The instrument of claim 6, wherein the frequency increments are 100 Hz.

12. A method for measuring the thickness of a single-layer nonferromagnetic conductive material, comprising:
   calculating the summed outputs, represented by the variable $x_1$, of a pick-up coil, the pick-up coil being contained within a flux focusing eddy current probe comprising an excitation coil, a pick-up coil, and a flux-focusing lens disposed between the excitation coil and the pick-up coil, induced by the excitation coil over predetermined frequency increments within a predetermined frequency range for a thin test coupon having a thickness represented by the variable $y_1$ and having the same material as the sample to be measured;
   calculating the summed outputs represented by the variable $x_2$ of the pick-up coil induced by the excitation coil over predetermined frequency increments within a predetermined frequency range for a thick test coupon having a thickness represented by the variable $y_2$ and having the same material as the sample to be measured;
   calculating the variables a and b in the algorithm $y=ax^b$ using the data points $(x_1,y_1)$ and $(x_2,y_2)$, thereby calibrating the instrument;
   calculating the thickness of the sample using the algorithm, the calculated variables a and b, and the summed pick-up coil outputs for the sample over predetermined frequency increments within a predetermined frequency range.

13. The instrument of claim 12, wherein the frequency range and frequency increments are the same for the thin test coupon and the thick test coupon.

14. The instrument of claim 12, wherein the frequency range is the same for the thin and thick test coupons but the frequency increments are different.

15. The instrument of claim 12, wherein the frequency range is from 1 kHz to 20 kHz.

16. The instrument of claim 12, wherein the frequency increments are 100 Hz.

* * * * *